(12) United States Patent
Matsumoto et al.

(10) Patent No.: US 9,635,871 B2
(45) Date of Patent: May 2, 2017

(54) BEVERAGE PACKED IN SEALED CONTAINER

(71) Applicant: Taiyokagaku Co., Ltd., Yokkaichi (JP)

(72) Inventors: Masaki Matsumoto, Yokkaichi (JP); Tsutomu Okubo, Yokkaichi (JP)

(73) Assignee: Taiyokagaku Co., Ltd., Yokkaichi-Shi (JP)

( * ) Notice: Subject to any disclaimer, the term of this patent is extended or adjusted under 35 U.S.C. 154(b) by 0 days.

(21) Appl. No.: 13/751,493

(22) Filed: Jan. 28, 2013

(65) Prior Publication Data

US 2013/0209633 A1    Aug. 15, 2013

Related U.S. Application Data

(63) Continuation of application No. 11/575,369, filed as application No. PCT/JP2005/017142 on Sep. 16, 2005, now abandoned.

(30) Foreign Application Priority Data

Sep. 22, 2004  (JP) ................................ 2004-276187

(51) Int. Cl.
| | | |
|---|---|---|
| *A23F 3/16* | (2006.01) | |
| *A23L 2/56* | (2006.01) | |
| *A23F 5/24* | (2006.01) | |

(52) U.S. Cl.
CPC .............. *A23F 3/163* (2013.01); *A23F 5/243* (2013.01); *A23L 2/56* (2013.01)

(58) Field of Classification Search
CPC .... A23F 3/163; A23F 3/16; A23F 3/14; A23F 3/06; A23F 3/00; A23F 5/24; A23L 2/56; A23V 2200/048; A23V 2200/04; A23V 2250/0646; A23V 2250/06; A23V 2250/038; A23V 2250/00; A23V 2002/00; A23V 2250/708; A23V 2200/02; C08L 2666/02; C08L 1/02; C08L 97/02; C08L 53/02; C08L 101/00; C08L 5/08; C08L 75/04; C08L 75/16; C08L 2666/04; C08L 2666/14; C08L 79/02; C08L 95/00; C08L 5/00

USPC ................................ 426/597, 321, 324, 590
See application file for complete search history.

(56) References Cited

U.S. PATENT DOCUMENTS

| | | | |
|---|---|---|---|
| 5,501,866 A | 3/1996 | Kakuda et al. | |
| 6,268,009 B1 * | 7/2001 | Ekanayake et al. | 426/597 |
| 6,462,051 B1 | 10/2002 | Nozawa et al. | |
| 2002/0122835 A1 | 9/2002 | Bucci et al. | |
| 2003/0077374 A1 * | 4/2003 | Ohishi et al. | 426/597 |
| 2005/0287278 A1 * | 12/2005 | Quan et al. | 426/597 |
| 2006/0159829 A1 | 7/2006 | Owen et al. | |

FOREIGN PATENT DOCUMENTS

| | | |
|---|---|---|
| JP | 04-253916 A1 | 9/1992 |
| JP | 2001-187736 A1 | 7/2001 |
| JP | 2001-316295 A1 | 11/2001 |
| JP | 2001-321115 A1 | 11/2001 |
| JP | 2002-265359 A1 | 9/2002 |
| JP | 2002-322063 A1 | 11/2002 |
| JP | 2003-169603 A1 | 6/2003 |
| JP | 2004-189626 A1 | 7/2004 |

\* cited by examiner

*Primary Examiner* — Jill Warden
*Assistant Examiner* — Hong T Yoo
(74) *Attorney, Agent, or Firm* — Burr & Brown, PLLC

(57) ABSTRACT

An object of the present invention is to provide a beverage packed in a sealed container, which can suppress occurrence of precipitation for a long period and retain high flavor. The above-described problem can be overcome by containing (1) theanine ranging from 100 mg to 1000 mg and (2) quinic acid ranging from 30 mg to 300 mg per 500 ml beverage.

1 Claim, No Drawings

BEVERAGE PACKED IN SEALED CONTAINER

CROSS-REFERENCE TO RELATED APPLICATIONS

This application is a continuation of U.S. application Ser. No. 11/575,369, filed Mar. 15, 2007, which is a national stage of International Application No. PCT/JP2005/017142, filed Sep. 16, 2005 (the entireties of which are incorporated herein by reference), and claims the benefit under §119 (a)-(d) of Japanese Patent Application No. 2004-276187, filed Sep. 22, 2004.

FIELD OF THE INVENTION

The present invention relates to a beverage packed in a sealed container and containing theanine and quinic acid.

BACKGROUND OF THE INVENTION

Theanine is known as a principal component of deliciousness of green tea and is an important substance as a flavor component of food such as tea. It is pointed out that γ-glutamyl derivative containing theanine acts as a biologically active substance in animals and plants. Particularly for human, it is known that theanine has effects of suppressing and ameliorating various symptoms accompanying diminished homeostasis such as sensitivity to cold, menopausal symptoms, sleep disorder, autonomic imbalance symptoms, etc. (Patent document 1).

An extremely large amount of tea needs to be taken when theanine is taken only from conventional green tea in order that the above-mentioned physiological effect may be developed. Accordingly, a technique for dispensing high-concentration theanine in beverage has been desired in order that a large amount of theanine may be taken more easily.

On the other hand, when tea beverage is sealed in a container, there is a problem that a macromolecular component such as pectin, hemicellulose or the like separates out as precipitation during long term preservation. Some methods have been reported to solve the problem (Patent documents 2 and 3, for example).

Patent document 2 discloses a technique for filtering green tea extract by an ultrafilter membrane to eliminate a macromolecular component. Although this technique can achieve the prevention of precipitation, flavorful components of tea adsorb to a filter medium. As a result, there is a disadvantage that a flavor particular to tea is diminished.

Furthermore, patent document 3 discloses a technique for preparing green tea in an acid range and thereafter quenching the green tea so that turbidity is enhanced. The turbidity is eliminated by centrifugation, and a supernatant solution is added with diatom earth and is filtrated. Thereafter, pH is re-prepared into a neutral range. Filtration of diatom earth also removes flavor component of tea in this technique.

Patent document 1: JP-A-2000-247878
Patent document 2: JP-A-H04-45744
Patent document 3: JP-A-H04-311348

SUMMARY OF THE INVENTION

The present invention was made in view of the foregoing problem and an object thereof is to provide a beverage packed in a sealed container, which can suppress occurrence of precipitation, retain high-level flavor and contain high-density theanine for a long period.

Means for Solving the Problem

The inventors found that a beverage could be preserved stably for a long period by blending theanine and quinic acid at a predetermined ratio and achieved the present invention.

Thus, a beverage contained in a sealed container in accordance with the first invention for overcoming the above-mentioned problem is characterized in that the beverage per 500 ml contains (1) theanine ranging from 100 mg to 1000 mg and (2) quinic acid ranging from 30 mg to 300 mg.

In the above invention, it is preferable that the beverage is a tea beverage. It is further preferable that tea extract powder and tea extract are added to the beverage.

EFFECT OF THE INVENTION

According to the present invention, the beverage contained in the sealed container can suppress occurrence of precipitation for a long period and retain high-level flavor. Furthermore, since the beverage contains high-concentration theanine, the advantage that theanine offers a physiological effect can be expected.

DETAILED DESCRIPTION OF THE INVENTION

An embodiment of the present invention will be described in detail. However, the technical scope of the invention should not be limited by the following description of the embodiment, and the invention can be practiced in various modified forms. Furthermore, it is noted that the technical scope of the invention should encompass the scope of equivalence.

Theanine used in the invention is a glutamic acid derivative contained in tea leaves and a principal component of deliciousness of tea. Theanine is used as a food additive for use as taste component. Theanine is called γ-glutamilethylamide or L-glutamic acid-γ-ethylamide and used as a food additive for seasoning.

In an acute toxicity test with use of mice, no mice died and abnormality was found in an ordinary state, weight and the like even in the case of oral administration of theanine by 2 g/kg. Thus, theanine is an exceedingly safe substance.

A method of producing theanine used in the present invention includes, for example, an organic synthesis (Chem. Pharm. Bull. (7) 1301-1307 (1971)), an enzyme method (JP-A-H05-68578, JP-A-H05-328986) or a modified procedure in which an ethylamine derivative such as ethylamine hydrochloride is used as ethylamine, a method in which pyroglutamic acid is caused to react with ethylamine hydrochloride (JP-A-H09-263573), plant cell culture method (JP-A-H05-123166), a method of extracting theanine from tea leaves, etc. Of these methods, it is preferable that theanine is produced by the extract or enzyme method from each of which a large amount of theanine can be obtained at low costs although the theanine producing method is particularly not limited to these methods. The tea leaves include various types of tea having their roots in tea (Camellia sinensis) such as green tea, oolong tea, black tea.

Theanine has two optical isomers, L-type and D-type. Of these two isomers, any one of L-theanine, D-theanine, and DL-theanine is usable. In particular, L-theanine is admitted as food additive and is easy to use from an economical point.

Accordingly, it is preferable to use L-theanine in the present invention. An amount of theanine is, as a lower limit, 100 mg, 150 mg, 200 mg or 300 mg and as an upper limit, 500 mg, 700 mg, 800 mg or 1000 mg per 500 ml beverage. A specific range can be exemplified as from 100 mg to 1000 mg, from 150 mg to 1000 mg, from 200 mg to 1000 mg, from 300 mg to 1000 mg, from 300 mg to 500 mg or the like.

Beverage means a liquid serving for drinking. For example, as beverage are exemplified tea beverage such as green tea, oolong tea, black tea (tea with lemon, tea with milk), herb tea, etc., concentrated juice, from-concentrate juice, juice, mixture of fruit juices, fruit juice with fruit grain, beverage with fruit grain, mixture of fruit and vegetable, vegetable juice, carbonated beverage, refreshing beverage, milk beverage, Japanese sake, beer, wine, cocktail, shochu, whisky, etc. Of these beverages, the present invention can be preferably practiced in tea beverages.

A beverage contained in a sealed container means beverage substantially inhibits movement of substance (including gas) in and out of the container. For example, the beverage includes a beverage contained in a metal container, such as steel can, aluminum can, etc., a beverage contained in a plastic container such as PET bottle.

Quinic acid is 3,4,5-tetrahydroxycyclohexane-1-carboxylic acid. Quinic acid exists in Chnchona, coffee seed, leaves of Beta vulgaris, fruit such as apple, strawberry, grapes, blue berry, cranberry, raspberry. When quinic acid is absorbed into the body, it is metabolized into hippuric acid in the liver, keeping urine acidic and having an effect of suppressing growth of bacterium. Quinic acid used in the present invention may be, for example, an extract from a plant, chemical synthesis or the like without origin.

An amount of quinic acid is, as a lower limit, 30 mg, 40 mg or 50 mg and as an upper limit, 100 mg, 150 mg, 200 mg, 250 mg or 300 mg per 500 ml beverage. A specific range can be exemplified as from 30 mg to 300 mg, from 40 mg to 300 mg, from 30 mg to 100 mg, from 50 mg to 100 mg or the like.

Tea extract powder includes tea leaves such as powdered tea obtained by pulverizing tea leaves by a millstone, powder of extract from tea leaves or the like. Tea extract powder can be prepared by extraction from tea leaves of black tea, oolong tea, green tea, boiled tea, coarse green tea using hot water and thereafter, carrying out spray drying or freeze dehydration thereby to obtain powder with a suitable grain diameter.

Tea extract means water extract from tea leaves or mixed liquid extract from tea leaves, water and organic solvent. Tea extract can be used as a concentrate. A method of concentrating tea extract is exemplified as (1) a method of extracting water content from extract of tea leaves to obtain a concentrate, suspending the concentrate in water or a mixture of water and a solvent, adding an organic solvent to the suspended concentrate, thereby removing resultant precipitation, and distilling the solvent away, (2) a method of extracting water content from extract of tea leaves to obtain a concentrate, dissolving the concentrate in an organic solvent, adding water or a mixture of water and an organic solvent to the dissolved concentrate, thereby removing resultant precipitation, and distilling the solvent away. Tea extract which is usable in the invention may be a solid, water solution, a slurry or the like.

Furthermore, the beverage contained in a sealed container in accordance with the present invention may be used with material allowed as food, such as herb, amino acid, vitamin or mineral.

There is no specific limitation to the herb used with the beverage. However, for example, the herb may include anise, carrot seed, cloves, coriander, cypress, cinnamon, juniper, ginger, sweet orange, basil, patchouli, bitter orange, fennel, black pepper, bay, peppermint, bergamot, mandarin, myrrh, lemon grass, rosemary, vanilla, hyssop, eucalyptus, lime, lemon, ylangylang, cardamom, clarysage, jasmine, geranium, Bulgarian rose, rose, olibanum, matricaria, sandalwood, verbena, petit grain, vetivera zizanoides, marjoram, Melissa officinelis, rosewood, Hypericum, kava kava, St. Jones Wart, valerian, passion flower, hop, rafuma (*Apocynum venetum*), blackcohosh (*cimicifuga rasemosa*), chamomile, extract of Korean ginseng, lemon balm, rosemary and the like.

There is no specific limitation to the amino acid used with the beverage. However, for example, the amino acid may include GABA (gamma-aminobutyric acid), glutamine, glutamic acid, inosinic acid, alanine, arginine, asparagine acid, threonine, Serine, taurine, thiotaurine, hypotaurine and the like.

There is no specific limitation to the vitamin used with the beverage. However, for example, the vitamin may include vitamin A, vitamin $B_1$, vitamin $B_2$, vitamin $B_6$, vitamin $B_{12}$, vitamin C, vitamin E, vitamin K, folic acid, lipoic acid, pantothenic acid, biotin, ubiquinone, prostaglandin, etc. and derivatives of these vitamins.

There is no specific limitation to the mineral used with the beverage. However, for example, the mineral may include calcium, iron, magnesium, copper, zinc, selenium, potassium and the like.

EXAMPLE 1

(1) Theanine Preparation 1

Theanine was prepared based on the technique disclosed as an embodiment in gazette of Japanese Patent No. 2139750. More specifically, 0.3 M glutamine and 1.5 M ethylamine were reacted in the presence of 0.3 U/ml glutaminase (refined from pseudomonas nitroreducens IFO 12694) at 30° C. for 22 hours in a boric acid buffer fluid ($Na_2B_4O_7$—NaOH, pH 11), whereby theanine was obtained. Reaction liquid was applied to Dowex 50×8 column chromatgraphy and Dowex 1×2 column chromatography thereby to be eluted by ethanol, whereby theanine was refined. As a result, 5 kg L-theanine was obtained. In the following description, the theanine prepared by the above-described preparing method will be referred to as "theanine 1."

(2) Theanine Preparation 2

1500 kg water was warmed up to 80° C., and 100 kg green tea leaves were added to the warmed water and stirred for 30 minutes so that tea dregs were removed. Thereafter, filtration and concentrated refinement were carried out. The concentrated liquid was passed through cation-exchange resin and eluted by 1N NaOH. An activated carbon treatment was carried out, and the obtained liquid was spray-dried, whereby 10 kg preparation of 30% theanine was obtained. In the following description, the theanine prepared by the above-described preparing method will be referred to as "theanine 2."

(3) Preparation of Tea Extract Powder Containing Quinic Acid 1500 kg water was warmed up to 80° C., and 100 kg green tea leaves were added to the warmed water and stirred for 30 minutes so that tea dregs were removed. Thereafter, filtration and concentrated refinement were carried out. The concentrated liquid was spray-dried, whereby 20 kg tea extract containing 1 kg quinic acid was obtained (that is, the content of quinic acid is 0.05 mg/mg extract powder).

(4) Quinic Acid

Quinic acid manufactured by KANTO CHEMICAL CO., INC. was used.

EXAMPLE 2

(1) Preparation of Tea Beverage:

Extraction from 1 kg tea leaves of green tea was carried out in 10 liter hot water (60° C.) for 30 minutes and thereafter, solid-liquid separation was carried out by a filtration process, whereby 7 liter green tea extract was obtained.

Theanine 1, Theanine 2, quinic acid and tea extract powder containing quinic acid were blended together with blending quantities of the respective substances shown by TABLE 1 and put into a polyethylene terephthalate (PET) bottle aseptically after ultra high temperature (UHT) sterilization (sterilization at 135° C. for 3 seconds), whereby a beverage contained in a sealed container was prepared. Thus, 8 types of test beverages (1 to 8) and two types of comparative beverages (9 and 10; comparative example) were prepared.

TABLE 1

| | Test beverage | | | | | | | |
|---|---|---|---|---|---|---|---|---|
| | 1 | 2 | 3 | 4 | 5 | 6 | 7 | 8 |
| Theanine 1 (mg) | 100 | 100 | 300 | 300 | | | 100 | 300 |
| Theanine 2 (mg) | | | | | 500 | 1000 | | |
| Quinic acid (mg) | 50 | 100 | 50 | 100 | 50 | 50 | | |
| Tea extract powder (mg) | | | | | | | 1000 | 1000 |
| Green tea extract (ml) | 450 | 450 | 450 | 450 | 450 | 450 | 450 | 450 |
| Drinking water | adj. | adj. | adj. | adj. | adj. | adj. | adj. | adj. |
| Total (ml) | 500 | 500 | 500 | 500 | 500 | 500 | 500 | 500 |
| Theanine Content | 115 | 115 | 315 | 315 | 165 | 315 | 130 | 330 |
| Quinic acid Content | 70 | 120 | 70 | 120 | 70 | 70 | 70 | 70 |

| | Comparative beverage | |
|---|---|---|
| | 9 | 10 |
| Theanine 1 (mg) | | |
| Theanine 2 (mg) | | |
| Quinic acid (mg) | | |
| Tea extract Powder (mg) | 1000 | |
| Green tea extract (ml) | 450 | 450 |
| Drinking water | adj. | adj. |
| Total (ml) | 500 | 500 |
| Theanine Content | 15 | 15 |
| Quinic acid Content | 70 | 20 |

Where adj. is an abbreviation of "adjustment".

Furthermore, Theanine and quinic acid were analyzed by the following process regarding the test beverages and comparative beverages.

Process for Analyzing Theanine:

Analysis was carried out by liquid chromatography using a preparation of L-theanine. The conditions of analysis were as follows:

The following was used:

Analytical column: Develosil ODS HG-5/Nomura Chemical Co., Ltd. Column dimensions: 4.6 mm I. D.×150 mm L Precolumn: Develosil ODS HG-5/Nomura Chemical Co., Ltd. Column dimensions: 4.0 mm I. D.×10 mm L Detector: Waters 2487 Dual λ UV/VIS detector/Waters A mixture of 20 ml methanol, 980 ml ultrapure water and 1 ml trifluoroacetic acid was used as a mobile phase. A ratio of a peak area of an internal standard substance to a peak area of a standard detected component was obtained from the resultant chromatogram. An analytical curve was plotted, and an amount of sample theanine was obtained from the analytical curve.

Process for Analyzing Quinic Acid:

Each test substance was pretreated in a perchloric acid solution and thereafter measured by a high-performance liquid chromatography manufactured by Shimadzu Corporation.

(2) Preservation Test:

A preservation test was conducted under 7-day and 30-day sampling conditions at 50° C. regarding sealed beverages.

Regarding the turbidity, the sealed beverages were checked with eyes and evaluated in three levels of "clear," "slightly clear" and "opaque." Regarding precipitation, the sealed beverages were evaluated in four levels based on the precipitation phase. Furthermore, regarding organoleptic evaluation, the sealed beverages were tasted and evaluated by 10 panelists. A five-level evaluation was carried out. The sealed beverage with the best flavor scored five points, whereas the sealed beverage with the worst flavor scored 1 point. A mean of the evaluation by all the panelists was obtained.

The results of evaluation are shown by TABLE 2 (7-day preservation) and TABLE 3 (30-day preservation). Precipitation is shown in four levels. Symbol "−" designates "no precipitation." Symbol "±" designates "slight precipitation." Symbol "+" designates "a small amount of precipitation." Symbol "++" designates "a large amount of precipitation."

TABLE 2

| | Test beverage | | | | | | | |
|---|---|---|---|---|---|---|---|---|
| | 1 | 2 | 3 | 4 | 5 | 6 | 7 | 8 |
| Turbidity | clear | clear | clear | clear | clear | clear | clear | clear |
| Precipitation | ± | − | − | − | − | − | − | − |
| Flavor | 4.2 | 4.8 | 4.8 | 5.0 | 5.0 | 5.0 | 4.7 | 5 |

| | Comparative beverage | |
|---|---|---|
| | 9 | 10 |
| Turbidity | slightly clear | opaque |
| Precipitation | ± | ++ |
| Flavor | 3.4 | 2.0 |

TABLE 3

| | Test beverage | | | | | | | |
|---|---|---|---|---|---|---|---|---|
| | 1 | 2 | 3 | 4 | 5 | 6 | 7 | 8 |
| Turbidity | clear | clear | clear | clear | clear | clear | clear | clear |
| Precipitation | ± | − | − | − | − | − | − | − |
| Flavor | 3.1 | 4.5 | 4.4 | 4.6 | 4.5 | 4.6 | 4.5 | 4.6 |

TABLE 3-continued

|  | Comparative beverage | |
| --- | --- | --- |
|  | 9 | 10 |
| Turbidity | opaque | opaque |
| Precipitation | + | ++ |
| Flavor | 2.2 | 1.1 |

As obvious from the above tables, each of the test beverages 1 to 8 has no turbidity and is clear both after 7-days preservation and after 30-days preservation. Furthermore, although test beverage 1 has slight precipitation after 7-days preservation and 30-days preservation, the other test beverages 2 to 8 each have no precipitation. Furthermore, regarding flavor, each of the test beverages 1 to 8 retains a high value both after 7-days preservation and after 30-days preservation.

On the other hand, each of the comparative beverages 9 and 10 has turbidity and precipitation both after 7-days preservation and after 30-days preservation. Furthermore, the flavor of each of the comparative beverages 9 and 10 has been found to be reduced.

As described above, the tea beverage containing theanine and quinic acid and put in the sealed container has been proved to have no turbidity, to suppress precipitation and to retain good flavor even after a long-term preservation.

EXAMPLE 3

Black Tea Beverage Contained in a Sealed Container (1) Preparation of Black Tea Beverage:

Extraction from 1 kg tea leaves of black tea was carried out in 10 liter hot water (60° C.) for 30 minutes and thereafter, solid-liquid separation was carried out by a filtration process, whereby 7 liter black tea extract was obtained.

Theanine 1, Theanine 2, quinic acid and black tea extract powder containing quinic acid were blended together with blending quantities of the respective substances shown by TABLE and put into a PET bottle aseptically after ultra high temperature (UHT) sterilization (sterilization at 135° C. for 3 seconds), whereby a beverage contained in a sealed container was prepared. Thus, 6 types of test beverages (11 to 16) and two types of comparative beverages (17 and 18; comparative example) were prepared.

Furthermore, contents of theanine and quinic acid in each beverage were analyzed in the same manner as in the embodiment 2.

TABLE 4

|  | Test beverage | | | | | | Comparative beverage | |
| --- | --- | --- | --- | --- | --- | --- | --- | --- |
|  | 11 | 12 | 13 | 14 | 15 | 16 | 17 | 18 |
| Theanine 1 (mg) | 100 | 100 | 300 | 300 |  |  | 100 |  |
| Theanine 2 (mg) |  |  |  |  | 500 | 1000 |  |  |
| Quinic acid (mg) | 50 | 100 | 50 | 100 | 50 | 50 |  |  |
| Black tea extract (ml) | 450 | 450 | 450 | 450 | 450 | 450 | 450 | 450 |
| Drinking water | adj. | adj. | adj. | adj. | adj. | adj. | adj. | adj. |
| Total (ml) | 500 | 500 | 500 | 500 | 500 | 500 | 500 | 500 |

TABLE 4-continued

|  | Test beverage | | | | | | Comparative beverage | |
| --- | --- | --- | --- | --- | --- | --- | --- | --- |
|  | 11 | 12 | 13 | 14 | 15 | 16 | 17 | 18 |
| Theanine Content | 110 | 110 | 310 | 310 | 160 | 310 | 110 | 10 |
| Quinic acid Content | 60 | 110 | 60 | 110 | 60 | 60 | 10 | 10 |

Where adj. is an abbreviation of "adjustment".

(2) Preservation Test:

A preservation test was conducted under 7-days and 30-days sampling conditions at 50° C. regarding sealed beverages.

The results of evaluation are shown by TABLE 5 (7-days preservation) and TABLE 6 (30-days preservation). Turbidity (degree of transparency), precipitation and flavor are similar to those described in paragraph (2) of Example 2 and accordingly the description of them will be eliminated.

TABLE 5

|  | Test beverage | | | | | |
| --- | --- | --- | --- | --- | --- | --- |
|  | 11 | 12 | 13 | 14 | 15 | 16 |
| Turbidity | clear | clear | clear | clear | slightly clear | clear |
| Precipitation | ± | – | – | – | – | – |
| Flavor | 4.4 | 4.6 | 4.8 | 5.0 | 4.6 | 4.8 |

|  | Comparative beverage | |
| --- | --- | --- |
|  | 17 | 18 |
| Turbidity | slightly clear | opaque |
| Precipitation | ± | ++ |
| Flavor | 3.3 | 2.0 |

TABLE 6

|  | Test beverage | | | | | |
| --- | --- | --- | --- | --- | --- | --- |
|  | 11 | 12 | 13 | 14 | 15 | 16 |
| Turbidity | clear | clear | clear | clear | slightly clear | clear |
| Precipitation | ± | – | – | – | – | – |
| Flavor | 3.3 | 4.4 | 4.6 | 4.8 | 4.4 | 4.6 |

|  | Comparative beverage | |
| --- | --- | --- |
|  | 17 | 18 |
| Turbidity | opaque | opaque |
| Precipitation | ++ | ++ |
| Flavor | 2.1 | 1.2 |

As obvious from the above tables, although test beverage 15 has slight turbidity after 30-day preservation, each of the other test beverages has no turbidity and is clear both after 7-days preservation and after 30-days preservation. Furthermore, although test beverage 11 has slight precipitation after 7-days preservation and 30-days preservation and test beverage 15 has slight precipitation after 30-days preservation, the other test beverages each have no precipitation. Furthermore, regarding flavor, each of the test beverages 11 to 16 retains a high value both after 7-days preservation and after 30-days preservation.

On the other hand, each of the comparative beverages 17 and has turbidity or is opaque and has a large amount of precipitation both after 7-days preservation and after 30-days preservation. Furthermore, the flavor of each of the comparative beverages has been found to be reduced.

As described above, the tea beverage containing theanine and quinic acid and put in the sealed container has been proved to have no turbidity, to suppress precipitation and to retain good flavor even after a long-term preservation.

EXAMPLE 4

Beverage Containing Lemon Juice (1) Preparation of Beverage:

Theanine 1, theanine 2 and quinic acid were added to drinking water with 25 g lemon juice, 30 g fructose and 0.5 g fragrance according to blending quantities of the respective substances shown by TABLE 7 and then sterilized at 80° C. The beverage was then packed into a PET bottle aseptically, whereby a beverage contained in a sealed container was prepared. Thus, five types of test beverages (19 to 23) and three types of comparative beverages (24 to 26; comparative example) were prepared.

Furthermore, contents of theanine and quinic acid in each beverage were analyzed in the same manner as in the Example 2.

TABLE 7

|  | Test beverage | | | | | Comparative beverage | | |
| --- | --- | --- | --- | --- | --- | --- | --- | --- |
|  | 19 | 20 | 21 | 22 | 23 | 24 | 25 | 26 |
| Theanine 1 (mg) | 100 | 100 | 300 | 300 |  |  | 100 |  |
| Theanine 2 (mg) |  |  |  |  | 500 |  |  |  |
| Quinic acid (mg) | 50 | 100 | 50 | 100 | 50 | 100 |  |  |
| Fructose (g) | 30 | 30 | 30 | 30 | 30 | 30 | 30 | 30 |
| Lemon juice (g) | 25 | 25 | 25 | 25 | 25 | 25 | 25 | 25 |
| Fragrance (g) | 0.5 | 0.5 | 0.5 | 0.5 | 0.5 | 0.5 | 0.5 | 0.5 |
| Drinking water | adj. | adj. | adj. | adj. | adj. | adj. | adj. | adj. |
| Total (ml) | 500 | 500 | 500 | 500 | 500 | 500 | 500 | 500 |
| Theanine Content (mg) | 100 | 100 | 300 | 300 | 150 | 0 | 100 | 0 |
| Quinic acid Content (mg) | 60 | 110 | 60 | 110 | 60 | 60 | 10 | 10 |

Where adj. is an abbreviation of "adjustment".

(2) Preservation Test:

A preservation test was conducted under 7-days and 30-days sampling conditions at 50° C. regarding the sealed beverages.

The results of evaluation are shown by TABLE 8 (7-days preservation) and TABLE 9 (30-days preservation). Turbidity (degree of transparency), precipitation and flavor are similar to those described in paragraph (2) of Example 2 and accordingly the description of them will be eliminated.

TABLE 8

|  | Test beverage | | | | |
| --- | --- | --- | --- | --- | --- |
|  | 19 | 20 | 21 | 22 | 23 |
| Turbidity | clear | clear | clear | clear | slightly clear |
| Precipitation | ± | − | − | − | − |
| Flavor | 4.8 | 4.8 | 4.8 | 5.0 | 4.8 |

TABLE 8-continued

|  | Comparative beverage | | |
| --- | --- | --- | --- |
|  | 24 | 25 | 26 |
| Turbidity | slightly clear | slightly clear | opaque |
| Precipitation | ± | ± | ++ |
| Flavor | 3.0 | 3.3 | 2.0 |

TABLE 9

|  | Test beverage | | | | |
| --- | --- | --- | --- | --- | --- |
|  | 19 | 20 | 21 | 22 | 23 |
| Turbidity | clear | clear | clear | clear | slightly clear |
| Precipitation | ± | − | ± | − | ± |
| Flavor | 4.0 | 4.4 | 4.0 | 4.0 | 3.9 |

|  | Comparative beverage | | |
| --- | --- | --- | --- |
|  | 24 | 25 | 26 |
| Turbidity | opaque | opaque | opaque |
| Precipitation | ++ | ++ | ++ |
| Flavor | 2.2 | 2.1 | 1.2 |

As obvious from the above tables, although test beverage 23 has slight turbidity after 30-days preservation, each of the other test beverages has no turbidity and is clear both after 7-days preservation and after 30-days preservation. Furthermore, although test beverage 19 has slight precipitation after 7-days preservation and 30-days preservation and each of test beverages 21 and 23 has slight precipitation after 30-days preservation, the other test beverages each have no precipitation. Furthermore, regarding flavor, each of the test beverages 19 to 23 retains a high value both after 7-days preservation and after 30-days preservation.

On the other hand, each of the comparative beverages 24 to has turbidity or is opaque and has a large amount of precipitation both after 7-days preservation and after 30-days preservation. Furthermore, the flavor of each of the comparative beverages has been found to be reduced.

As described above, the lemon juice beverage containing theanine and quinic acid and packed in the sealed container has been proved to have no turbidity, to suppress precipitation and to retain good flavor even after a long-term preservation.

EXAMPLE 5

Tea Beverage Contained in a Sealed Container (1) Preparation of Barley Tea Beverage:

Extraction from 1 kg barley tea was carried out in 10 liter hot water (60° C.) for 30 minutes and thereafter, solid-liquid separation was carried out by a filtration process, whereby 7 liter barley tea extract was obtained.

Theanine 1, Theanine 2, quinic acid and black tea extract powder containing quinic acid were blended together with blending quantities of the respective substances shown by TABLE 10 and put into a PET bottle aseptically after ultra high temperature (UHT) sterilization (sterilization at 135° C. for 3 seconds), whereby a beverage contained in a sealed container was prepared. Thus, five types of test beverages (27 to 31) and three types of comparative beverages (32 to 34; comparative example) were prepared. Furthermore, contents of theanine and quinic acid in each beverage were analyzed in the same manner as in the Example 2.

TABLE 10

|  | Test beverage | | | | | Comparative beverage | | |
| --- | --- | --- | --- | --- | --- | --- | --- | --- |
|  | 27 | 28 | 29 | 30 | 31 | 32 | 33 | 34 |
| Theanine 1 (mg) | 100 | 100 | 300 | 300 |  |  | 100 |  |
| Theanine 2 (mg) |  |  |  |  | 500 | 1000 |  |  |
| Quinic acid (mg) | 50 | 100 | 50 | 100 | 50 | 50 |  |  |
| Barley tea extract (ml) | 450 | 450 | 450 | 450 | 450 | 450 | 450 | 450 |
| Drinking water | adj. | adj. | adj. | adj. | adj. | adj. | adj. | adj. |
| Total (ml) | 500 | 500 | 500 | 500 | 500 | 500 | 500 | 500 |
| Theanine Content (mg) | 100 | 100 | 300 | 300 | 150 | 0 | 100 | 0 |
| Quinic acid Content (mg) | 50 | 100 | 50 | 100 | 50 | 100 | 0 | 0 |

Where adj. is an abbreviation of "adjustment".

(2) Preservation Test:

A preservation test was conducted under 7-days and 30-days sampling conditions at 50° C. regarding sealed beverages.

The results of evaluation are shown by TABLE 11 (7-days preservation) and TABLE 12 (30-days preservation). Turbidity (degree of transparency), precipitation and flavor are similar to those described in paragraph (2) of Example 2 and accordingly the description of them will be eliminated.

TABLE 11

| | Test beverage | | | | |
| --- | --- | --- | --- | --- | --- |
|  | 27 | 28 | 29 | 30 | 31 |
| Turbidity | clear | clear | clear | clear | clear |
| Precipitation | − | − | − | − | − |
| Flavor | 5.0 | 4.9 | 4.9 | 5.0 | 4.8 |

| | Comparative beverage | | |
| --- | --- | --- | --- |
|  | 32 | 33 | 34 |
| Turbidity | slightly clear | slightly clear | opaque |
| Precipitation | ± | ± | ++ |
| Flavor | 4.0 | 3.9 | 3.6 |

TABLE 12

| | Test beverage | | | | |
| --- | --- | --- | --- | --- | --- |
|  | 27 | 28 | 29 | 30 | 31 |
| Turbidity | clear | clear | clear | clear | slightly clear |
| Precipitation | ± | − | ± | ± | ± |
| Flavor | 3.9 | 4.0 | 4.0 | 4.4 | 3.9 |

| | Comparative beverage | | |
| --- | --- | --- | --- |
|  | 32 | 33 | 34 |
| Turbidity | opaque | opaque | opaque |
| Precipitation | ++ | ++ | ++ |
| Flavor | 2.0 | 2.0 | 1.2 |

As obvious from the above tables, although test beverage 31 has slight turbidity after 30-days preservation, each of the other test beverages has no turbidity and is clear both after 7-days preservation and after 30-days preservation. Furthermore, although each of test beverages 27 and 29 to 31 has slight precipitation after 30-days preservation, the other test beverages each have no precipitation. Furthermore, regarding flavor, each of the test beverages 27 to 31 retains a high value both after 7-days preservation and after 30-days preservation.

On the other hand, each of the comparative beverages 32 to 34 has turbidity or is opaque and has a large amount of precipitation both after 7-days preservation and after 30-day preservation. Furthermore, the flavor of each of the comparative beverages has been found to be reduced.

As described above, the barley tea beverage containing theanine and quinic acid and put in the sealed container has been proved to have no turbidity, to suppress precipitation and to retain good flavor even after a long-term preservation.

EXAMPLE 6

Coffee Beverage Contained in a Sealed Container (1) Preparation of Coffee Beverage:

Extraction from 1 kg roasted and ground coffee beans was carried out in five liter hot water (90° C.) for 30 minutes and thereafter, solid-liquid separation was carried out by a filtration process, whereby four liter coffee extract was obtained.

Theanine 1, Theanine 2, quinic acid and black tea extract powder containing quinic acid were blended together with blending quantities of the respective substances shown by TABLE 13 and put into a PET bottle aseptically after ultra high temperature (UHT) sterilization (sterilization at 135° C. for 3 seconds), whereby a beverage contained in a sealed container was prepared. Thus, six types of test beverages (35 to 39) and three types of comparative beverages (40 to 42; comparative example) were prepared. Furthermore, contents of theanine and quinic acid in each beverage were analyzed in the same manner as in the Example 2.

TABLE 13

|  | Test beverage | | | | | Comparative beverage | | |
| --- | --- | --- | --- | --- | --- | --- | --- | --- |
|  | 35 | 36 | 37 | 38 | 39 | 40 | 41 | 42 |
| Theanine 1 (mg) | 100 | 100 | 300 | 300 |  |  | 100 |  |
| Theanine 2 (mg) |  |  |  |  | 500 |  |  |  |
| Quinic acid (mg) | 50 | 100 | 50 | 100 | 50 | 100 |  |  |
| Coffee extract (ml) | 450 | 450 | 450 | 450 | 450 | 450 | 450 | 450 |
| Drinking water | adj. | adj. | adj. | adj. | adj. | adj. | adj. | adj. |
| Total (ml) | 500 | 500 | 500 | 500 | 500 | 500 | 500 | 500 |
| Theanine Content (mg) | 100 | 100 | 300 | 300 | 150 | 0 | 100 | 0 |
| Quinic acid Content (mg) | 55 | 105 | 55 | 105 | 55 | 105 | 5 | 5 | where adj. is an abbreviation of "adjustment".

(2) Preservation Test:

A preservation test was conducted under 7-days and 30-days sampling conditions at 50° C. regarding sealed beverages.

The results of evaluation are shown by TABLE 11 (7-days preservation) and TABLE 12 (30-days preservation). Turbidity (degree of transparency), precipitation and flavor are similar to those described in paragraph (2) of example 2 and accordingly the description of them will be eliminated.

TABLE 14

| | Test beverage | | | | |
|---|---|---|---|---|---|
| | 35 | 36 | 37 | 38 | 39 |
| Turbidity | slightly clear | clear | clear | clear | slightly clear |
| Precipitation | ± | − | − | − | ± |
| Flavor | 4.8 | 5.0 | 5.0 | 5.0 | 4.8 |

| | Comparative beverage | | |
|---|---|---|---|
| | 40 | 41 | 42 |
| Turbidity | slightly clear | slightly clear | opaque |
| Precipitation | ++ | ++ | ++ |
| Flavor | 3.4 | 3.4 | 2.9 |

TABLE 15

| | Test beverage | | | | |
|---|---|---|---|---|---|
| | 35 | 36 | 37 | 38 | 39 |
| Turbidity | slightly clear | clear | clear | clear | slightly clear |
| Precipitation | ± | − | − | − | ± |
| Flavor | 4.0 | 4.2 | 4.2 | 4.4 | 3.9 |

| | Comparative beverage | | |
|---|---|---|---|
| | 40 | 41 | 42 |
| Turbidity | opaque | opaque | opaque |
| Precipitation | ++ | ++ | ++ |
| Flavor | 2.2 | 2.1 | 1.2 |

As obvious from the above tables, although each of test beverages 35 and 39 has slight turbidity after both 7-days preservation and 30-days preservation, each of the other test beverages has no turbidity and is clear both after 7-days preservation and after 30-days preservation. Furthermore, although each of test beverages 35 and 39 has slight precipitation after both 7-days preservation and 30-days preservation, the other test beverages each have no precipitation. Furthermore, regarding flavor, each of the test beverages 35 to 39 retains a high value both after 7-days preservation and after 30-days preservation.

On the other hand, each of the comparative beverages 40 to has turbidity or is opaque and has a large amount of precipitation both after 7-days preservation and after 30-days preservation. Furthermore, the flavor of each of the comparative beverages has been found to be reduced.

As described above, the coffee beverage containing theanine and quinic acid and put in the sealed container has been proved to have no turbidity, to suppress precipitation and to retain good flavor even after a long-term preservation.

Examples of the present invention are as follows
(1) A tea beverage put in a sealed container, characterized in that the beverage contains L-theanine ranging from 100 mg to 1000 mg and quinic acid ranging from 30 mg to 300 mg per 500 ml beverage.
(2) The tea beverage as described in above (1), characterized in that tea extract powder is added to the tea beverage.
(3) A black tea beverage put in a sealed container, characterized in that the beverage contains L-theanine ranging from 100 mg to 1000 mg and quinic acid ranging from 30 mg to 300 mg per 500 ml beverage.
(4) A coffee beverage put in a sealed container, characterized in that the beverage contains L-theanine ranging from 100 mg to 1000 mg and quinic acid ranging from 30 mg to 300 mg per 500 ml beverage.
(5) The beverage as described in any one of above (1) to (4), characterized in that the sealed container is a metal container.
(6) The beverage as described in above (5), characterized in that the metal container is a steel can.
(7) The beverage as described in above (5), characterized in that the metal container is an aluminum can.
(8) The beverage as described in any one of above (1) to (4), characterized in that the sealed container is a plastic container.
(9) The beverage as described in above (8), characterized in that the plastic container is a PET bottle.
(10) The beverage as described in any one of above (1) to (9), characterized in that the beverage contains a herb.
(11) The beverage as described in any one of above (1) to (10), characterized in that the beverage contains GABA.

The invention claimed is:
1. A method for maintaining clarity of a beverage in a sealed container without precipitation, the method consisting essentially of the steps of:
   providing a container comprising one of an aluminum can and a polyethylene terephthalate bottle;
   providing a beverage selected from the group consisting of a tea beverage, a black tea beverage, and a coffee beverage;
   adding directly to the beverage theanine in an amount of 100 mg to 300 mg, quinic acid in an amount of 50 mg to 100 mg per 500 ml of the beverage, respectively, and optionally one of an herb and gamma-aminobutyric acid, wherein a ratio of the amount of theanine to quinic acid is in a range of 1:1 to 6:1;
   providing the beverage in the container; and
   sealing the container;
   wherein more than 4.0 points of a five-level flavor evaluation is obtained, with a best flavor being scored 5 points and a worst flavor being scored 1 point in the five-level flavor evaluation, and wherein the beverage has no turbidity and is clear and shows no precipitation after a 30-day preservation.

* * * * *